Feb. 5, 1952 A. R. NARRIN 2,584,906
CLUTCH DRIVEN PLATE
Filed May 15, 1947 3 Sheets-Sheet 1
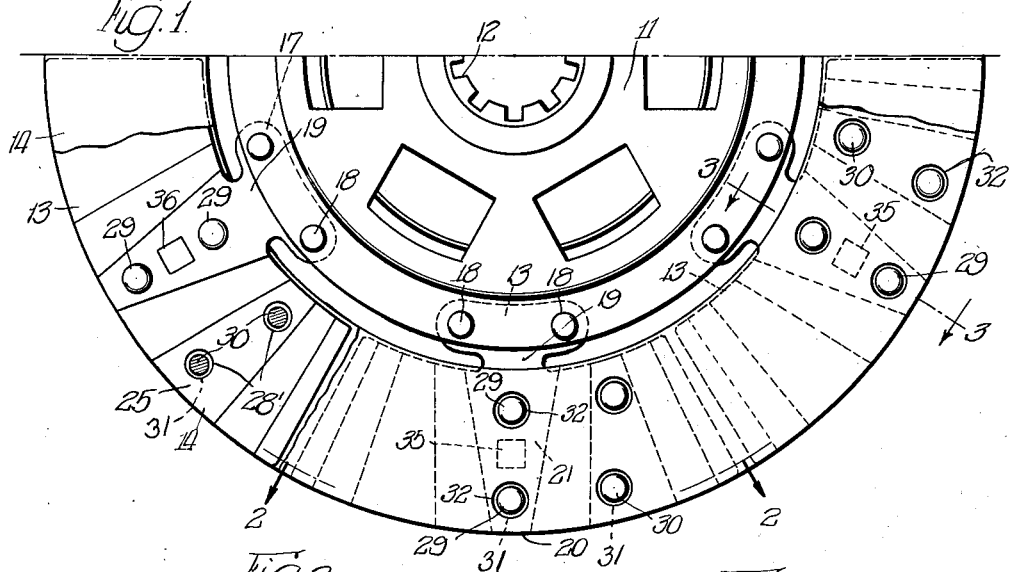
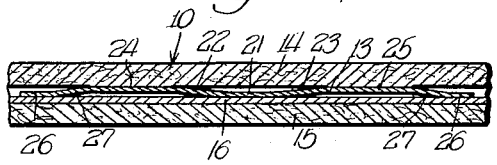
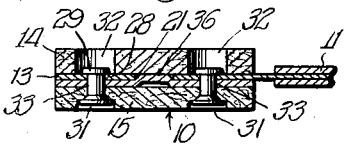
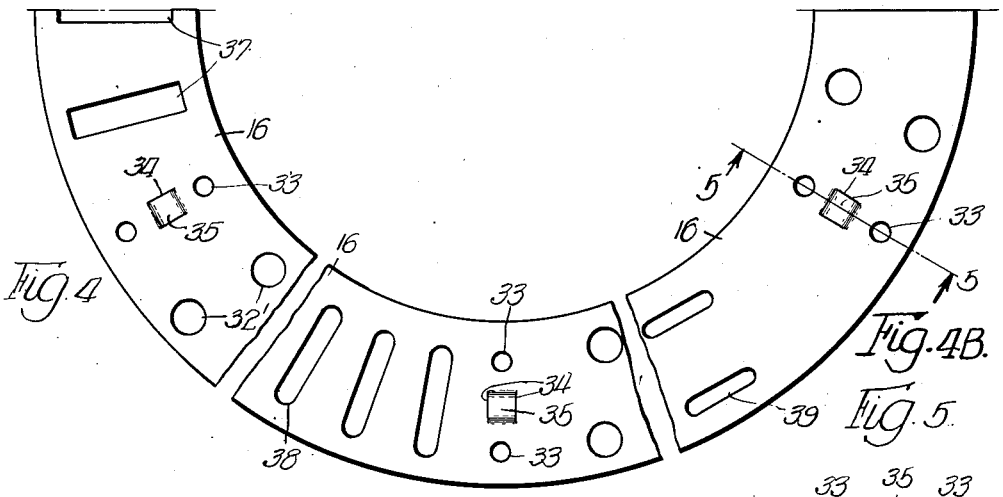
INVENTOR.
Austin R. Narrin,
BY
Cromwell, Greist & Warden
Attys.

Feb. 5, 1952     A. R. NARRIN     2,584,906
CLUTCH DRIVEN PLATE
Filed May 15, 1947     3 Sheets-Sheet 2
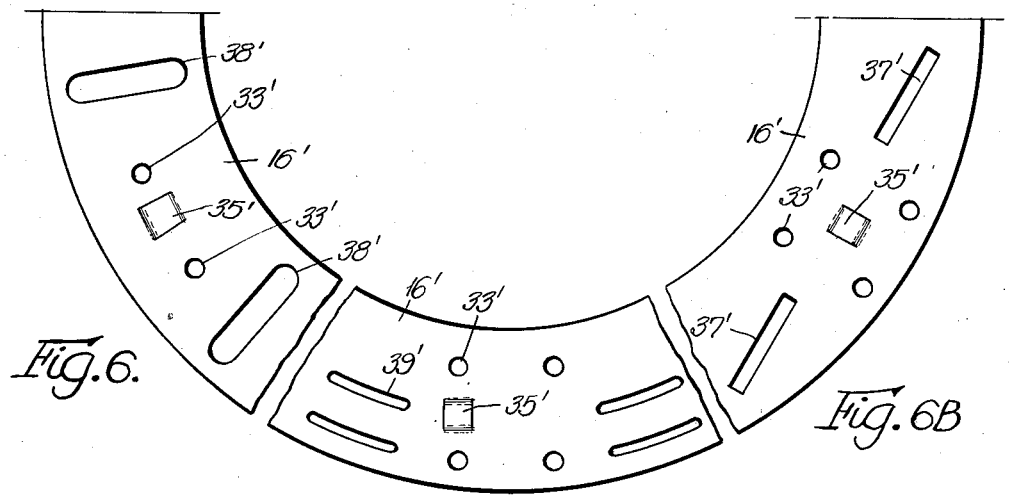
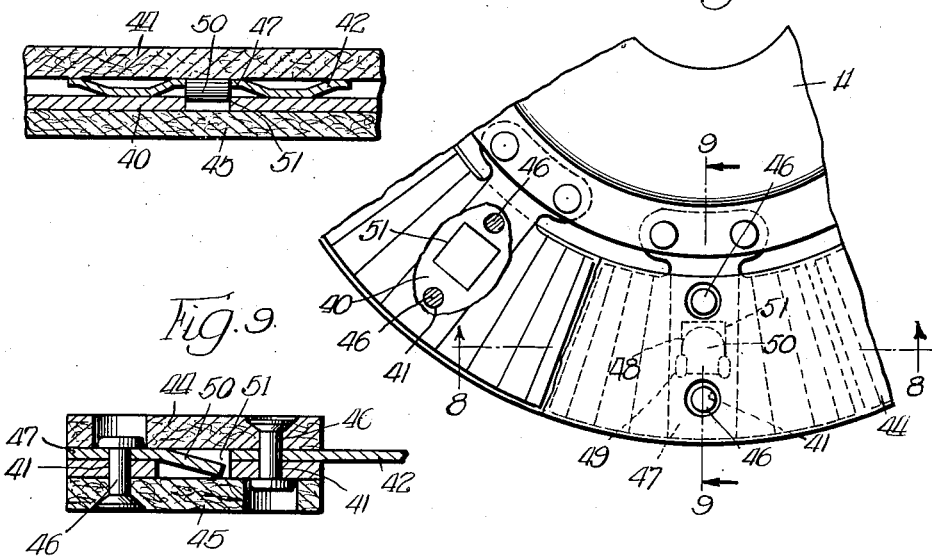
INVENTOR.
Austin R. Narrin,
BY
Cromwell, Greist & Warden
Attys.

Feb. 5, 1952  A. R. NARRIN  2,584,906
CLUTCH DRIVEN PLATE
Filed May 15, 1947  3 Sheets-Sheet 3
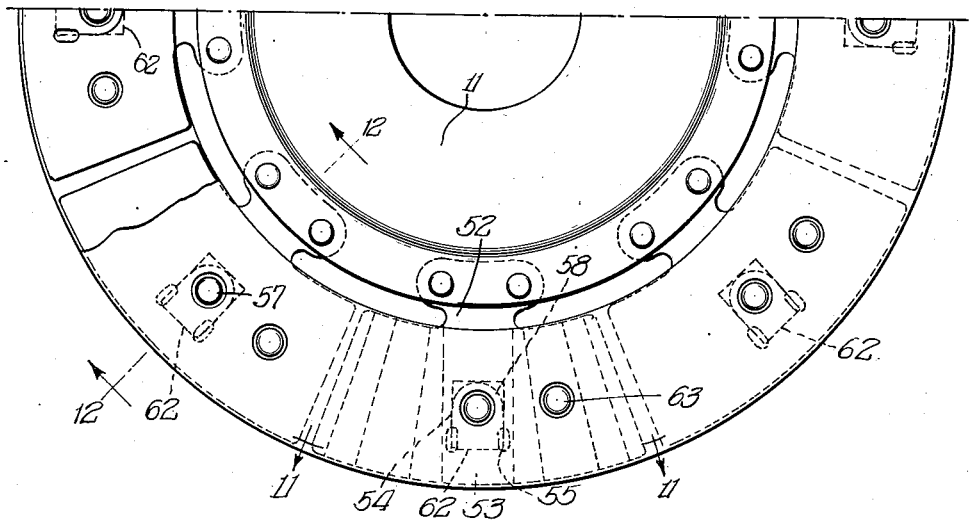
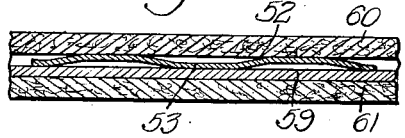
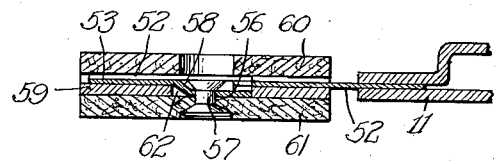
INVENTOR.
Austin R. Narrin,
BY Patented Feb. 5, 1952

2,584,906

UNITED STATES PATENT OFFICE 2,584,906

CLUTCH DRIVEN PLATE

Austin R. Narrin, Lake Orion, Mich., assignor to George I. Goodwin, Birmingham, Mich.

Application May 15, 1947, Serial No. 748,171

9 Claims. (Cl. 192—107)

This invention pertains to improvements in a clutch driven plate for automotive installation, and in particular to a coordinated combination of parts whereby a clutch plate assembly may be fabricated in any desired or requisite outer and inner facing diameter and free and compressed axial thickness, suitable for installation in any one of a large variety of types of automotive clutches.

It is an object of the invention to provide a clutch plate including a central supporting disk and standard friction facings and cushion members, together with an additional internal spacing and driving ring, whereby in employing one of a limited number of rings chosen for appropriate thickness, diameter, polar moment etc., with standard clutch friction facings and cushion members drilled in conformity with the rivet drilling pattern of the facings, one may readily assemble a clutch plate to satisfy any one of many different automotive clutch plate specifications.

Another object is to provide a clutch plate assembly including an annular spacing ring of the type described associated in a driving relation to the spring cushion means of the plate in such a manner as to provide major torsional support between the several cushion means during the operation of the assembly, whereby the design of certain cushion members constituting said means may be altered to increase the cushioning efficiency thereof, without sacrificing torsional rigidity or strength in the plate assembly as a whole.

A still further object is to provide a novel driving and spacing ring as a component of a clutch driven plate, which ring when properly chosen and combined with cushions and facings enables the assembly of a clutch plate in any of a large variety of specified dimensions, yet employing but a comparatively small number of standardized types of cushion members and facings.

The foregoing statements are indicative in a general way of the nature of the invention, but other and more specific objects will be apparent to those skilled in the art upon a full understanding of the construction and operation of the device.

Several embodiments of the invention are presented herein for purpose of exemplification, and it will be appreciated that the invention is susceptible of incorporation in still other modified forms coming equally within the scope of the appended claims.

In the drawings,

Fig. 1 is a fragmentary face view, broken away in part, illustrating a driven clutch plate assembly in accordance with one form of the present invention;

Fig. 2 is a fragmentary view in section on line 2—2 of Fig. 1, showing the undulatory outline of a cushion member of the assembly in its relation to the opposed friction facings and an intermediate selected driving and spacing ring according to the invention;

Fig. 3 is a fragmentary view in transverse section on line 3—3 of Fig. 1, further illustrating the spacing and driving relationships of the various components of the plate;

Figs. 4, 4A and 4B are fragmentary face views, illustrating three possible variations in structural details of the driving and spacing ring which is an important part of the plate assembly;

Fig. 5 is a view in section along the line 5—5 of Fig. 4B;

Figs. 6, 6A and 6B are views generally similar to Figs. 4, 4A and 4B, respectively illustrating a driving and spacing ring in accordance with three other modified embodiments thereof;

Fig. 7 is a fragmentary face view illustrating the principle of the invention as applied to a clutch plate in an alternative embodiment;

Figs. 8 and 9 are fragmentary sectional views on lines corresponding respectively to lines 8—8 and 9—9 of Fig. 7;

Fig. 10 is a fragmentary face view showing a clutch plate having the provisions of the invention incorporated therein in a still further modification which is somewhat similar to that of Figs. 7–9 inclusive, but differs in a manner which is hereinafter described in greater detail.

Figs. 11 and 12 are fragmentary sectional views taken on lines corresponding approximately to lines 11—11 and 12—12 of Fig. 10.

This invention pertains to improvements in an automotive clutch driven plate or plate assembly and is immediately concerned with the provision of such a plate to fill the needs of the replacement or repair trade. However, it will be evident that the principle of the invention is not necessarily limited in this respect and may indeed be readily applied in the manufacture of original equipment. Nevertheless, since the problems confronting a manufacturer attempting to meet the demand for replacement parts serve to emphasize the utility of the invention, the description is based upon its application to the replacement branch of the trade.

Heretofore, most clutch plate replacement units have been supplied with attached friction facings, ordinarily secured to the usual cushion means of the unit by rivets arranged in various patterns which do not conform to any standard pattern set up by the Brake Lining Manufacturers Association. Frequently, however, a demand is made for clutch plate disks which can be refaced at the option of the repairman with a proper friction facing which is drilled in accordance with B. L. M. A. standards. In such case the replacement unit must be of the appropriate outer and inner diameter and free and compressed axial thickness required by the clutch assembly in which it is to be installed. Since the maximum volume of clutch replacements is intended for use in automobiles anywhere from three to eight years of age, it is evident that the various automotive clutch manufacturers will have evolved numerous types of driven plates peculiar to the various automobile models presented over such a period, usually characterized by some special pattern of drilling for the facing securing rivets. Hence, the clutch plate builder, in order to meet all replacement demands, would either have to supply plates in many different variations of diameter, thickness, etc., of his own special design, or would have to develop and manufacture a large volume of clutch driven plate disks and cushions exactly identical as to drilling pattern with those employed in each and every one of a large number of automotive models. Various factors of a practical nature preclude either of these alternatives.

The present invention affords a plate assembly which is built to include one type of a relatively small number of specially designed cushion members, together with facings selected from readily available B. L. M. A. stock numbers, such selection being limited only by the requirement that the facing selected have a rivet hole drilling standard matching that existing in the particular cushion member with which it is to be used. These selected cushion members and facings are combined with a spacing ring of novel character, also chosen coordinately with regard to the cushions and facings and in accordance with the desided facing O. D. and I. D. and free and compressed axial plate dimension of the final replacement plate unit, to the end that a relatively small number of ring types and coacting parts will enable a manufacturer to meet a demand for a clutch plate in any one of a large number of specifications.

The invention also has an improved feature in that the spacing ring referred to additionally serves as a driving member coacting with and between the cushion members in distributing the torsional stress, to the end that the cushion members may be necked down at their connection to their supporting disk more than was previously possible, with resultant increase in efficiency of cushioning action.

Referring to Figs. 1 to 5 inclusive, the reference numeral 10 designates the plate assembly of the invention. This is made up generally of a central supporting disk 11, the hub of which is splined at 12 for driving connection to a shaft; a plurality of cushion members 13; a pair of standard friction facings 14, 15 of well known type located on the flywheel and pressure plate side of the assembly respectively; and an intervening spacing ring 16 located between the members 13 and the facing 15, and drivingly connected to the former in a manner to be described.

The cushion members each include an inner attaching portion or ear 17 secured to disk 11 by a pair of spaced rivets 18, and a necked-down, radially extending, intermediate portion 19 which at its outer end is integral with the main cushion wing portion 20 of the cushion. Said wing portion includes a central, flat bearing area 21, as shown in Fig. 2, adapted to engage spacer ring 16, which is connected to inclined spring areas 22, 23, which blend into flat bearing surfaces 24 and 25, abutting the adjacent facing 14. At its lateral extremities the cushion wing has areas 26 coplanar with area 21 and, like the same, in abutting engagement with the ring 16. Said terminal areas are connected to the bearing areas 24, 25 by intervening inclined spring areas 27.

In accordance with the invention springs 13 are provided with drilled, rivet receiving openings 28 in the central area 21 thereof for the reception of the rivets 29 by which the facing 15 is secured to the cushion wing. The area 25 has similar holes 28' therein for the reception of rivets 30 whereby the facing 14 is secured to the cushion member.

As illustrated in Fig. 3, the respective facings are in each case provided with rivet-receiving openings appropriately located at 31 to receive the respective rivets 29 and 30, as well as clearance openings 32 for access to the rivets in heading over the same. Clearance openings 32' are also formed in spacing ring 16, Fig. 4, to receive the rivets 30 which attach the upper facing 14 to the cushions.

The rivet drillings in each of the facings 14, 15 are, in the several forms of the invention shown, arranged in accordance with one of the standard B. L. M. A. patterns. Rings 16 are to be supplied with rivet holes 33 drilled in accordance with similar patterns, it being intended that several groups of such rings be made available, in which the rings of each group will vary in I. D., O. D. and thickness (as well as in other respects to be described), but will each have a uniform and standard drilling pattern. The pattern of each group will vary from that of another.

Cushion members 13 will also vary in their respective drilling pattern, it being contemplated that relatively few designs of cushion members are to be employed, each having one of a relatively few standard facing drilling patterns conforming respectively to those of the facings described above.

Accordingly, employing a central supporting disk 11 of given diameter having a group of cushion members 13 of some particular rivet drilling pattern secured thereon, it is possible to build up a clutch plate assembly of any desired facing O. D. and I. D. and any desired overall free and compressed thickness of the plate assembly by coordinating and incorporating therewith a properly selected spacing ring 16, along with facings 14, 15, also of desired selected and coordinated diameter and thickness. These facings and the ring 16 will have a corresponding predetermined pattern of rivet drilling which is one of several standard B. L. M. A. patterns. It is evident that any one of a relatively few optional sizes of ring and designs of cushion may be assembled with any one of a very large number of facing designs to produce a plate assembly suited to any of a large number of clutch plate specifications.

In addition to functioning as a spacer for the above purposes, the ring 16 drivingly connects to the respective cushion members 13 in a manner to assist the same in sustaining torque, thereby somewhat distributing among the cushion members the torsional or driving load, thus reducing the stress at the neck-down connecting portion 19 thereof. To this end the ring 16 is provided with pairs of radial slits 34 at points spaced peripherally thereof and is embossed between the slits to define a driving lug 35 (see Fig. 5). These lugs are located between the rivet holes 33 of the ring in the area thereof which contacts the flat central bearing area 21 of the cushion member. At corresponding spots on the cushion members the latter are provided with rectangular apertures 36, as illustrated in Figs. 1 and 3, mating with and receiving the driving lugs 35, to thereby drivingly couple the ring with the respective cushion members in the rotative sense. A supporting action between the cushion members is thereby developed which enables the connecting portions 19 thereof to be still further reduced or necked down in width, without unduly weakening the member at this point. As a result, a greater portion of the outer wing portion 20 of the cushion member is made available for cushioning purposes, without sacrificing the total torsional rigidity or strength of the driven plate assembly.

In addition to the provisions described above, the spacing and driving ring 16 provides a place where the polar moment of the assembly may be reduced without weakening the structure, thereby maintaining the lowest possible spinning inertia of the driven plate assembly as a whole. Referring particularly to Figs. 4, 4A and 4B, I illustrate therein a plurality of types of slots 37, 38, 39 in the respective figures arranged radially or circumferentially of the disk in desired or selected groupings for the purpose of reducing the weight of the ring in a balanced fashion. Any desired and practical pattern, spacing or shape of these apertures may be resorted to, the designs illustrated being but three of many possible variations to accomplish the desired end. The factor of weight of the ring 16 of course enters into the choice of the appropriate ring for a given built-up plate assembly, along with the factors of axial thickness, O. D. and I. D., to the ultimate end of securing a properly designed and fitted plate assembly for any given clutch installation.

In Figs. 6, 6A and 6B, I illustrate three further adaptations of spacer rings of the general types referred to above, hence designated by the reference numeral 16', but characterized by different (but still standard) arrangement of the rivet holes 33', as well as of the corresponding ring lightening slots 37', 38', 39', respectively and the connecting and driving lugs 35' by which the ring is torsionally coupled to the cushion members. In general, any slotting combination which removes weight from the ring 16, 16', or a comparable ring, without interfering with its strength or objectionably marring its surface at the points where it supports a facing or cushion wings, is contemplated by the invention.

A further modification of the invention is illustrated in Figs. 7, 8 and 9. In this form the driving ring, designated 40, has rivet receiving holes 41 located in radial spaced relation, as in the first embodiment, through which the cushion member 42 and the respective facings 44, 45 are secured together by rivets 46. In this instance the central area 47 of the wing portion of the cushion member is provided with a U-shaped slit 48 which terminates at its ends in the slotted apertures 49, so as to define a bendable locking lug, tongue or key 50 integral with and extending radially of the cushion. In assembling the parts this tongue is deflected into a correspondingly located mating aperture 51 in the ring 40, thereby rotatively locking the ring to the various cushions and effecting torsional support between the latter.

In Figs. 10, 11 and 12 a still further embodiment of the invention is illustrated, wherein the cushion members 52, in the central area 53 of the wing portion thereof, are each provided with a U-shaped slit 54 similar to the slit 48 of the preceding embodiment, and similarly terminating at its ends in slots 55. In this modification the hole 56 for the reception of the facing securing rivet 57 is formed in the tongue, lug or key 58 defined by said slit 54. In assembling the cushion member 52 to the spacing ring here designated 59, and to the facing 60, 61, the tongue 58 is deflected through a correspondingly located mating aperture 62 in the ring, after which rivet 51 is set to secure the facing 61 to this tongue. The latter thus acts as a cushion tying member and in addition as a rotative key. The other facing is held to the spring by the rivet 63 shown in Fig. 10 at one of the laterally spaced facing abutting areas or surfaces of the cushion. Inertia controlling openings may be provided, if desired, in ring 59, similar to the embodiments of Figs. 1-9 inclusive.

From the foregoing disclosure of several modes of embodying the invention, it will be evident that numerous equally effective substitutions can be readily evolved by those skilled in the art, all to the end of affording a combination including a driving and spacing ring of optional O. D., I. D. and axial thickness, selected from one of several groups or classes, each of which has one of a number of rivet drilling patterns correlated to one of a number of standard facing rivet drilling patterns; such ring being optionally associated with cushion members and standard facings for the purpose of producing any desired type or dimension of plate assembly. I therefore desire that the invention be construed no more limitedly than is reasonably indicated by the scope of the appended claims.

I claim:

1. In a clutch plate assembly, a supporting disk having circumferentially spaced cushion members of circumferentially undulatory outline secured thereto adjacent the periphery thereof, a single annular spacing ring independent of and separate from but concentric with said disk and of selected thickness and diameter, which ring is disposed on one axial side only of and in face-contacting engagement with said cushion members, with its inner periphery located outwardly of the outer periphery of said disk, and a pair of annular friction facings disposed concentrically of said ring in rotatively driving engagement respectively with the latter and with said cushion members, said cushion members, ring and facings being coordinately chosen in dimensions resulting in desired overall dimensions of the assembly, and means for securing the facings to said ring and cushion members, the maximum axial thickness of the assembled cushion members, spacing ring and facings at the axially engaging areas and in the fully compressed condition thereof being not in excess of the sum of the individual thicknesses thereof.

2. In a clutch plate assembly, a supporting disk having circumferentially spaced cushion members a circumferentially undulatory outline secured thereto adjacent the periphery thereof, an annular driving and spacing range independent of and separate from but externally concentric with said disk, said ring and respective cushion members having certain surface areas thereof disposed in constantly coplanar, face-contacting engagement with one another, and a pair of annular friction facings disposed concentrically of said ring in engagement respectively with the latter and with said cushion members, said respective members and ring having coacting means located in register with one another at said face contacting areas to rotatively couple the ring with the members in a manner to afford torsional support for the latter, and means for securing the facings to said ring and cushion members, the maximum axial thickness of the assembled cushion members, spacing ring and facings at the axially engaging areas and in the fully compressed condition thereof being not in excess of the sum of the individual thicknesses thereof.

3. A plate assembly comprising a supporting disk having circumferentially spaced cushion members of circumferentially undulatory outline secured thereto adjacent the periphery thereof to extend radially outwardly therefrom, an annular driving and spacing ring independent of and separate from but externally concentric with the disk, said ring and respective cushion members having certain surface areas thereof disposed in constantly coplanar, face-contacting engagement with one another, and a pair of annular friction facings disposed concentrically of said ring in respective engagement with the latter and with said cushion members, said respective members and ring having mating lug and recess means located in register with one another at said face contacting areas to rotatively couple the ring with the members in a manner to afford torsional support thereto, and means for securing the respective facings to said ring and cushion members, a maximum axial thickness of the assembled cushion members, spacing ring and facings at the axially engaging areas and in the fully compressed condition thereof being not in excess of the sum of the individual thicknesses thereof.

4. A plate assembly comprising a supporting disk having circumferentially spaced cushion members secured thereto adjacent the periphery thereof to extend radially outwardly therefrom, an annular driving and spacing ring independent of and separate from but externally concentric with the disk and disposed in face-contacting engagement with said cushion members, and a pair of annular friction facings disposed concentrically of said ring in respective engagement with the latter and with said cushion members, said members and ring having mating lug and recess means to rotatively and drivingly couple the ring with the members in a manner to afford torsional support thereto, and means for securing the respective facings to said ring and cushion members, comprising a rivet extending through the lug and recess of said mating means to clinch one of the facings to a cushion member, the maximum axial thickness of the assembled cushion members, spacing ring and facings at the axially engaging areas and in the fully compressed condition thereof being not in excess of the sum of the individual thicknesses thereof.

5. In a clutch plate, a supporting disk having a plurality of radially extending cushion members of circumferentially undulatory outlines secured thereto, a driving and spacing ring separate from and independent of said disk, said ring being disposed concentric with and radially outwardly of said disk and having face engagement with one side of said members, and a pair of facings respectively engaging the other side of said members and said ring, said ring being provided with circumferentially spaced, axially extending driving lugs and said respective members having apertures therein receiving said lugs to rotatively couple the ring and members, and means for securing said facings to said cushion members, said ring having weight reducing apertures therein to control the spinning inertia of the plate and being of variable dimension to selectively govern the overall dimension of the plate, the maximum axial thickness of the assembled cushion members, spacing ring and facings at the axially engaging areas and in the fully compressed condition thereof being not in excess of the sum of the individual thicknesses thereof.

6. In a clutch plate, a supporting disk having a plurality of radially extending cushion members secured thereto, a driving and spacing ring separate from and independent of said disk, said ring being disposed concentric with and radially outwardly of said disk and having face engagement with one side of said members, and a pair of facings located respectively on the other side of said members and in engagement with said ring, said members being provided with integral, circumferentially spaced, bendable tying elements and said ring having apertures therein receiving said elements to rotatively couple the ring and members, and means for securing said facings to said members comprising rivet-like members gripping one of the facings and said members and extending through said elements, the maximum axial thickness of the assembled cushion members, spacing ring and facings at the axially engaging areas and in the fully compressed condition thereof being not in excess of the sum of the individual thicknesses thereof.

7. In a clutch plate, a supporting disk having cushion members secured thereto to extend radially thereof, an independent spacing and driving ring separate from and concentric with said disk and secured to said members radially outwardly of the disk in axial engagement with one side of said members, a pair of annular friction facings concentric with the ring and disposed on opposite sides of said ring and members, means drivingly engaging the ring with said members to support the latter against torsional stress comprising bendable tongues on the respective members deflectable into position for rotative driving engagement with the ring, and rivets for securing the facings to said members, the maximum axial thickness of the assembled cushion members, spacing ring and facings at the axially engaging areas and in the fully compressed condition thereof being not in excess of the sum of the individual thicknesses thereof.

8. In a clutch plate, a supporting disk having cushion members secured thereto to extend radially thereof, a spacing and driving ring separate from and independent of said disk, said ring being disposed concentric with said disk and located radially outwardly of the same in axial engagement with one side of said members, a pair of annular friction facings concentric with the ring and disposed on opposite sides of said engaged ring and members, means drivingly engaging the ring with said members to support the latter against torsional stress comprising a bendable tongue on the respective members deflectable into position for rotative engagement with the ring and rivets for securing the facings to said members, said tongue having a hole therein receiving certain of said rivets, the maximum axial thickness of the assembled cushion members, spacing ring and facings at the axially engaging areas and in the fully compressed condition thereof being not in excess of the sum of the individual thicknesses thereof.

9. In a clutch plate, a supporting disk having a plurality of cushion members of circumferentially undulatory outline secured thereto, a driving and spacing ring independent of and separate from said disk and arranged externally concentric with the latter, said ring and respective cushion members having certain surface areas thereof in constantly coplanar, face engagement with one another, a pair of facings respectively engaging said ring and the side of said members opposite said ring, said ring and members having registering means to rotatively couple the same at said face engaging areas, and means for securing said facings to said cushion members, said ring having weight reducing apertures therein to control the spinning inertia of the plate, the maximum axial thickness of the assembled cushion members, spacing ring and facings at the axially engaging areas and in the fully compressed condition thereof being not in excess of the sum of the individual thicknesses thereof.

AUSTIN R. NARRIN.

REFERENCES CITED

The following references are of record in the file of this patent:

UNITED STATES PATENTS

| Number | Name | Date |
|---|---|---|
| 2,129,372 | Gamble | Sept. 6, 1938 |
| 2,146,042 | Wolfram | Feb. 7, 1939 |
| 2,171,908 | Beringer | Sept. 5, 1939 |
| 2,182,999 | Wolfram | Dec. 12, 1939 |
| 2,263,083 | Goodwin | Nov. 18, 1941 |

FOREIGN PATENTS

| Number | Country | Date |
|---|---|---|
| 779,669 | France | Apr. 10, 1935 |